March 15, 1932.  F. J. RODE  1,849,689
VALVE
Filed June 8, 1927  2 Sheets-Sheet 1
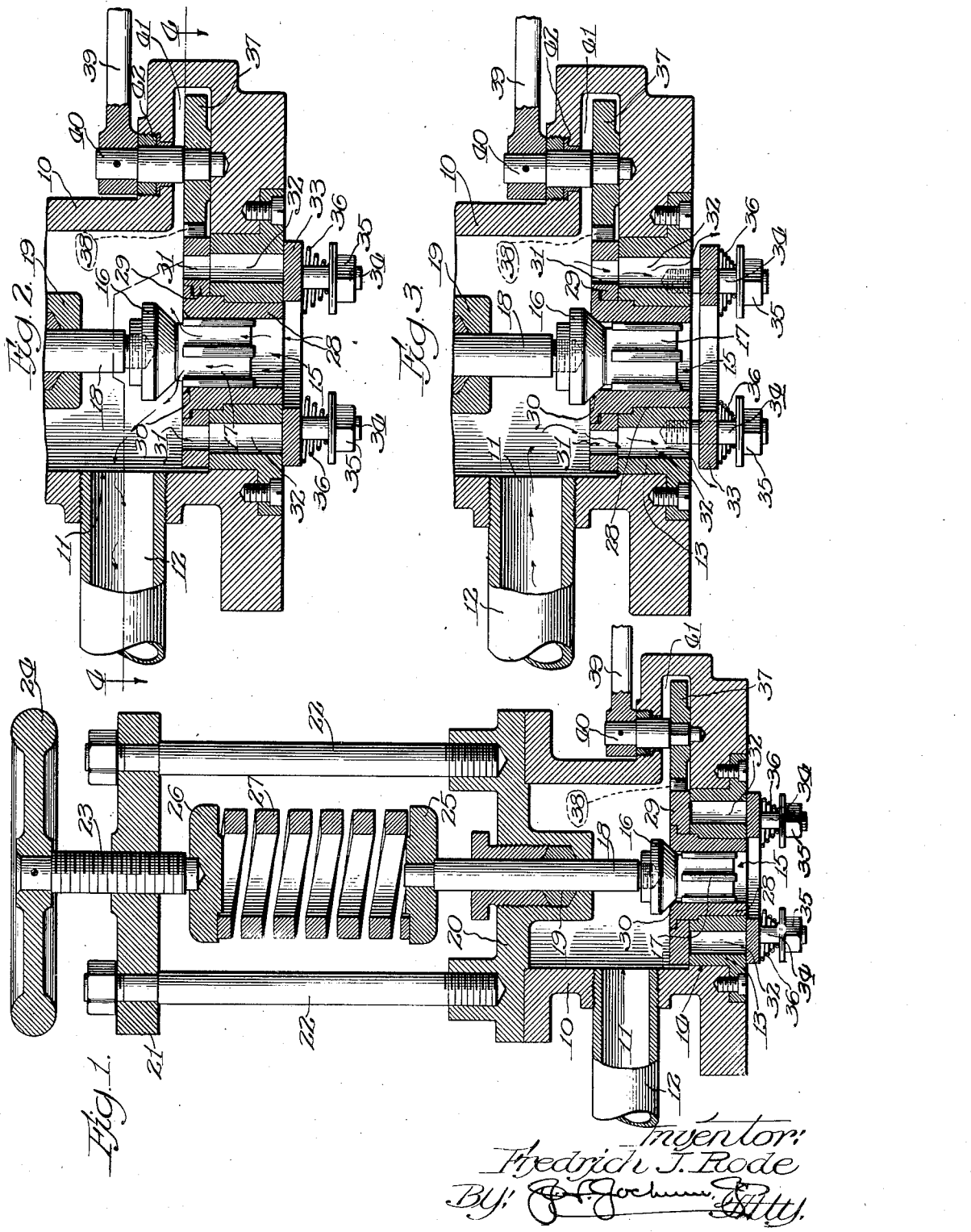

March 15, 1932.  F. J. RODE  1,849,689
VALVE
Filed June 8, 1927  2 Sheets-Sheet 2

Inventor:
Fredrich J. Rode

Patented Mar. 15, 1932

1,849,689

UNITED STATES PATENT OFFICE

FREDRICH J. RODE, OF CHICAGO, ILLINOIS, ASSIGNOR TO MARQUETTE TOOL & MFG. COMPANY, OF CHICAGO, ILLINOIS, A CORPORATION OF ILLINOIS

VALVE

Application filed June 3, 1927. Serial No. 197,262.

This invention relates to improvements in valves, and one of the objects of the same is to provide an improved valve embodying means whereby the valve may be readily and quickly converted at will into a check, relief or operating valve without adding to or subtracting from the valve and while the valve is installed and without dismantling any of the parts of the valve.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention and in which Figure 1 is a view partly in vertical section, partly broken away and partly in elevation of a valve embodying the principles of this invention.

Figure 2 is an enlarged detail sectional view of a portion of the valve, showing the parts in one position.

Figure 3 is a view similar to Figure 2, showing the parts in another position.

Figure 4:
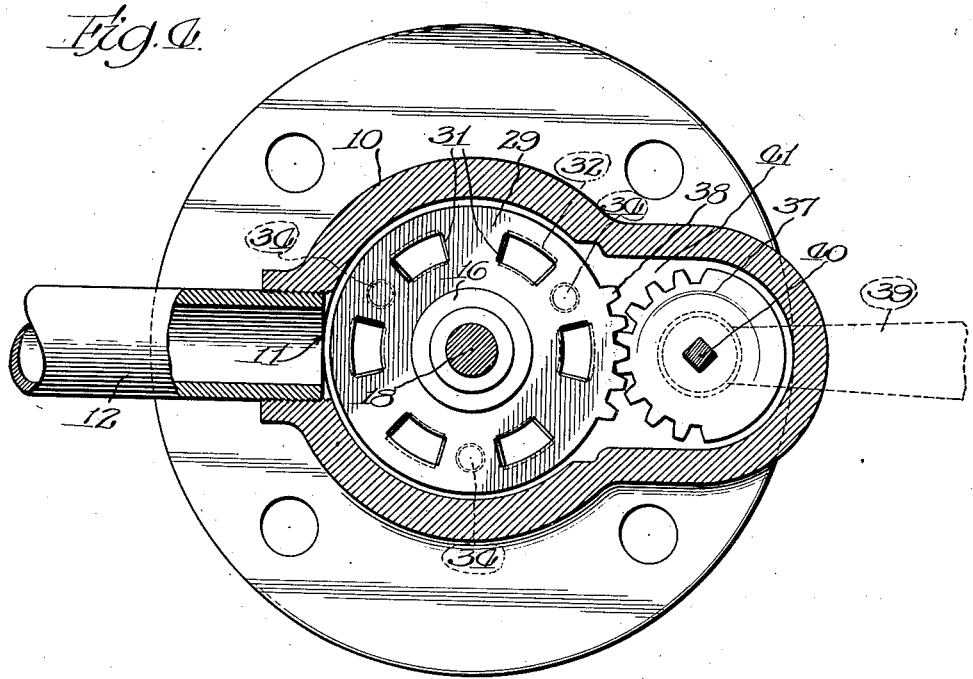
Figure 4 is a sectional view taken on line 4—4, Figure 2.
Figure 5:
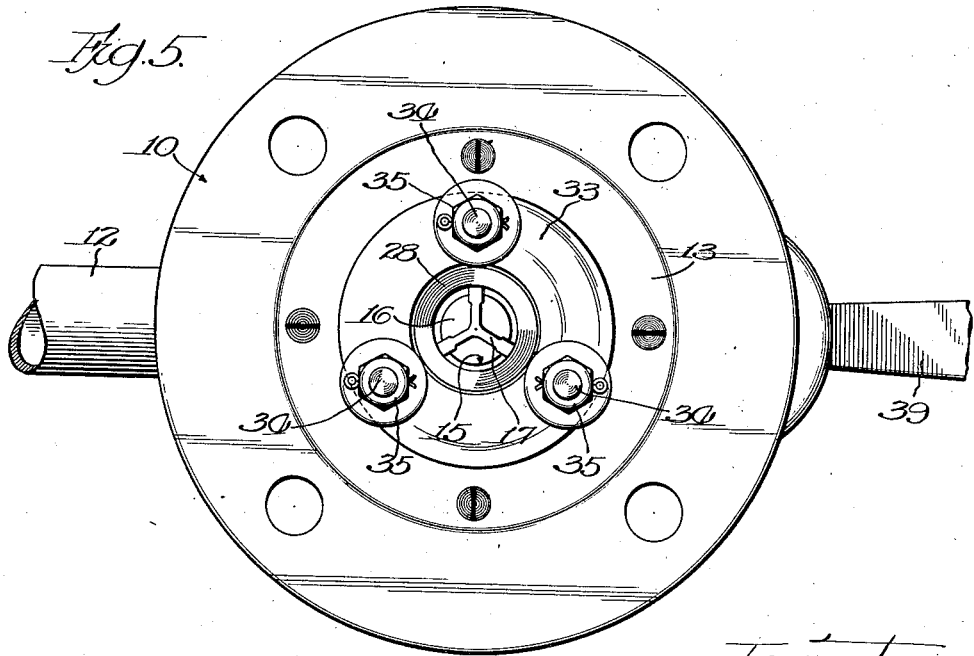
Figure 5 is a bottom plan view of Figure 1 with parts omitted.

Referring more particularly to the drawings the numeral 10 designates generally a valve casing which is provided with an opening 11 to which a pipe 12 is connected. The valve is also provided with a bearing 13 preferably secured to the bottom thereof and within an opening 14 in the valve casing.

The bearing 13 is provided with an opening 15 which is controlled by a valve 16 having a portion 17 movable in the opening 15.

Connected with the valve 16 is a stem 18 which passes through a suitable bushing 19 in the top 20 of the valve casing.

A member 21 is connected with the top of the valve casing and spaced therefrom in any suitable manner, preferably by means of the rods 22, and rotatably mounted preferably by means of screw threads in the member 21 is a screw 23 having an operating handle 24.

The screw 23 is preferably in alinement with the stem 18 and these two parts terminate short of each other. A member 25 engages the end of the valve stem 18 and the screw 23 has rotatable engagement with the member 26, similar to the member 25. These members 25—26 are spaced from each other for any desired distance and a resiliently yielding element 27, preferably in the form of a coil spring is disposed between the members 25 and 26 and has contact with each. The spring 27 tends normally to hold the valve 16 upon its seat and is adapted to be unseated against the stress of the spring 27 under a predetermined pressure. By adjusting the screw 23 it will be manifest that the pressure necessary to unseat the valve 16 may be varied at will.

The opening 15, which is controlled by the valve 16, is preferably formed by a sleeve or bushing member 28, the opening in which constitutes the opening 15 which directly receives the portion 17 of the valve 16. A disc 29 encompasses and is connected with the member 28, and a valve seat 30 with which the valve 16 directly cooperates encompasses the opening in the member 28. The disc or valve 29 is provided with openings 31, any number of which may be provided to register with openings 32 in the member 13, so as to form additional openings through the valve casing adjacent the valve 16.

An annular valve member 33, preferably in the form of a disc is supported by means of suitable supporting devices 34, such as bolts, and threaded upon these bolts are nuts 35. The valve member 33 moves loosely upon the bolts 34, and resiliently yielding elements 36 such as coil springs or the like are interposed between the valve 33 and the respective nuts 35. The stress of the resilient elements 36 tends normally to hold the valve 33 seated against the face of the member 13 so as to close the openings 32 therein and to prevent the passage of liquid through the openings 33, in one direction.

The disc valve 29 is adapted to be axially rotated so as to move the openings 31 out of register with the openings 32 and thereby close the openings 32 so that liquid cannot pass thereinto and against the valve 33, which would operate to unseat the valve 33, as shown in Figure 1.

Likewise, the valve 29 may be rotated from the position shown in Figure 1, to the positions shown in Figures 2 and 3, so as to permit liquid under pressure to enter the valve casing 10 and to then flow from the valve casing through the openings 31—32 against the valve 33 to unseat the latter (as shown in Figure 3) against the stress of the springs 36.

As soon as the pressure of the liquid upon the valve 33 is released the springs 36 will seat this valve.

At all times the valve 16 is adapted to be unseated by the pressure exerted thereupon through the opening 15, as shown in Figure 2, but the degree of pressure necessary to unseat the valve 16 may be varied at will, by varying the tension of the spring or resilient member 27.

Any suitable means may be provided for rotating the disc valve 29.

A suitable and efficient means embodies a gear 37, the teeth of which mesh with teeth 38 on the valve member 29. The teeth of the gear 37 and the teeth 38 on the valve member 29 may extend for any desired distance about the respective peripheries thereof.

The gear 37 is adapted to be rotated in any suitable manner such as by means of a handle 39 which is connected with a shaft 40, which in turn is connected with the gear 37. The gear 37 is located in a casing 41 which has communication with the interior of the valve casing, and the stem 40 passes through a suitable liquid tight bearing 42.

When the valve is to be used as a relief valve, adapted to be unseated by a predetermined pressure of fluid against the valve 16 so that liquid will flow through the opening 15 and out of the opening 11, and to prevent a back pressure or pressure upon the liquid in the opposite direction from flowing through the openings 32, the parts of the valve are set to the position shown in Figure 1, that is, so that the ports 31 in the valve member 29 will be moved out of register with the openings 32. The liquid will then flow into the opening 15 and when a predetermined pressure has been applied to the liquid the valve 16 will be unseated against the stress of the spring 27 and the liquid will flow out of the valve casing 10 and through the pipe 12.

When the structure is to be employed as a combined relief and check valve, the valve member 29 will be adjusted so that the ports 31 therein will be in register with the openings 32 so that the parts will be in the position shown in Figure 2. Liquid will flow into the valve casing 10 through the opening 15 and when a predetermined liquid pressure is exerted upon the valve 16, it will be unseated as shown in Figure 2, so that the liquid will flow in the direction indicated by the arrow. At the same time the stress of the springs 36 on the valve 33 and the pressure of the liquid upon this valve will cause the same to be seated so as to close the openings 32.

At the same time, however, when the parts are in this position and when the flow of liquid is reversed so that it will flow into the valve casing from the pipe 11 under a pressure, the liquid will pass through the openings 31 in the valve member 29 and into the openings 32. The pressure of the liquid will unseat the valve 33 against the stress of the springs 36 and the liquid will then flow out of the openings 32, as indicated by the arrows in Figure 3.

When it is desired to use the valve as an ordinary operating valve, that is so that the liquid will flow from the pipe 12 through the casing 10 and out of the openings 32, the member 29 is adjusted to the position shown in Figure 2, and in this position the pressure upon the liquid flowing into the openings 32 will unseat the valve 33, as shown in Figure 3.

It will therefore be manifest that with this improved construction and by. the adjustment of the valve 29 by the handle 39, the structure may be readily converted so as to be used as an ordinary operating valve, relief valve, or combined check and relief valve.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A valve embodying a casing, a plurality of openings in the casing for the passage of liquid, oppositely opening valves for respectively controlling said openings, means for establishing a predetermined yieldable resistance pressure upon one of said valves, an additional liquid passage leading to and from the valve casing, and means other than said valves for closing at will certain of said openings to render the respective controlling valve inactive while the other controlling valve remains active.

2. A valve embodying a casing, a plurality of openings in the casing for the passage of liquid, oppositely opening valves independent of each other for controlling the flow of liquid through said openings, resiliently yielding means individual to said valves for controlling them, an additional liquid passage leading to and from the valve casing, and means other than said valves and operable at will for closing the passage which is controlled by one of the said valves.

3. A valve embodying a casing, a plurality of passages for the liquid, valves for controlling the passages, said valves opening in opposite directions, and means other than said valves and operable at will for closing one of the passages for cutting off the unseating action of the liquid upon one of said valves while the other valve remains active.

4. A valve embodying a casing, a plurality of passages for the liquid, valves for controlling the passages, said valves opening in opposite directions, and means intermediate the said valves and operable at will for cutting off the unseating action of the liquid upon one of said valves while the other valve remains active.

5. A valve embodying a casing, a plurality of passages for the liquid, automatically operable reciprocable valves opening in opposite directions for controlling the said passages, and a rotatable valve operable at will for cutting off the unseating action of the liquid upon one of said reciprocable valves.

6. A valve embodying a casing, a passage for the liquid, an automatically operating valve at one end of the passage for closing it, a valve at the other end of said passage for closing it, said valves being independent of each other, means for actuating the last said valve for closing said passage, an additional passage for the liquid, and another and automatically operating valve for controlling the last said passage, the said automatically operating valves operating in opposite directions with respect to each other.

7. A valve embodying a casing, a passage for the liquid, an automatically reciprocable valve for closing the passage, a rotatable valve independent of the first said valve for also closing said passage at will, an additional passage for the liquid, and another and automatically reciprocable valve for controlling the last said passage, the said reciprocable valves being independent of each other and operating in opposite directions with respect to each other.

8. A valve embodying a casing, a passage for the liquid, an automatically reciprocable valve for closing the passage, a rotatable valve independent of the first said valve for also closing said passage at will, an additional passage for the liquid, another and automatically reciprocable valve for controlling the last said passage, the said reciprocable valves being independent of each other and operating in opposite directions with respect to each other, and means for varying at will the resistance pressure on one of the said reciprocable valves.

9. A valve embodying a casing, a passage for the liquid, an automatically reciprocable valve for closing the passage, a rotatable valve independent of the first said valve for also closing said passage at will, an additional passage for the liquid, and another and automatically reciprocable valve for controlling the last said passage, the said reciprocable valves being independent of each other and operating in opposite directions with respect to each other, the said additional passage extending through the said casing.

10. A valve embodying a casing having a passage for liquid, a resiliently yielding and automatically operated valve for controlling said passage, an additional valve for also controlling said passage, means for actuating the last said valve at will, an additional liquid passage in the casing, and another and resiliently yielding automatically actuated valve for controlling the last said passage, said additional valve being disposed between the said automatically actuated valves.

11. A valve embodying a casing having a passage for liquid, a resiliently yielding and automatically operated valve for controlling said passage, an additional valve for also controlling said passage, means for actuating the last said valve at will, an additional liquid passage in the casing, and another and resiliently yielding automatically actuated valve for controlling the last said passage, said additional valve being disposed between the said automatically actuated valves, the said additional passage passing directly through said additional valve and having a valve seat adapted to be engaged by one of the said automatically actuated valves.

12. As a unitary structure, combined oppositely opening check and relief valves controlling separate passages, and means other than said valves for closing one of said passages for rendering the said check valve inactive at will.

13. As a unitary structure, combined oppositely opening check and relief valves controlling separate passages, resiliently yielding means individual to each of the valves for controlling them, and means other than said valves for controlling one of said passages for rendering the said check valve inactive at will while the relief valve remains active.

14. As a unitary structure, combined oppositely opening check and relief valves controlling separate passages, resiliently yielding means individual to each of the valves for controlling them, and positive means other than said valves for controlling one of the passages for rendering the said check valve inactive at will while the relief valve remains active.

15. As a unitary structure, a check valve, a relief valve, said valves being oppositely opening and controlling separate passages, and positive means other than said valves for controlling one of the passages and means for selectively converting said structure into a relief valve only, a combined check and relief valve or an operating or control valve.

16. As a unitary structure, a check valve, a relief valve, said valves being oppositely opening, means for selectively converting said structure into a relief valve only, a combined check and relief valve or an operating or control valve, resiliently yielding means for controlling the relief valve, means for varying the stress of the last said means upon the relief valve at will, and resiliently yielding means for controlling the said check valve.

17. As a unitary structure, an automatically operable reciprocable relief valve, an automatically operable reciprocable check valve, said valves being oppositely opening, and a manually rotatable valve intermediate the relief and check valve for rendering active and inactive at will the unseating action of the liquid against the said check valve.

In testimony whereof I have signed my name to this specification on this 26th day of May, A. D. 1927.

FREDRICH J. RODE.